United States Patent
Ohashi

(10) Patent No.: US 12,174,297 B2
(45) Date of Patent: Dec. 24, 2024

(54) DISTANCE MEASUREMENT DEVICE, METHOD OF CONTROLLING DISTANCE MEASUREMENT DEVICE, AND ELECTRONIC APPARATUS

(71) Applicant: SONY SEMICONDUCTOR SOLUTIONS CORPORATION, Kanagawa (JP)

(72) Inventor: Kazuki Ohashi, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 232 days.

(21) Appl. No.: 17/753,870

(22) PCT Filed: Jul. 20, 2020

(86) PCT No.: PCT/JP2020/027983
§ 371 (c)(1),
(2) Date: Mar. 16, 2022

(87) PCT Pub. No.: WO2021/059699
PCT Pub. Date: Apr. 1, 2021

(65) Prior Publication Data
US 2022/0373682 A1 Nov. 24, 2022

(30) Foreign Application Priority Data
Sep. 25, 2019 (JP) .................. 2019-173696

(51) Int. Cl.
*G01S 17/36* (2006.01)
*G01B 11/02* (2006.01)
(Continued)

(52) U.S. Cl.
CPC .......... *G01S 17/36* (2013.01); *G01B 11/026* (2013.01); *G01C 3/06* (2013.01); *G01S 17/89* (2013.01)

(58) Field of Classification Search
CPC ........ G01S 17/36; G01S 17/89; G01S 7/4914; G01S 7/493; G01S 17/894; G01B 11/026; G01C 3/06
See application file for complete search history.

(56) References Cited

U.S. PATENT DOCUMENTS 6,122,597 A * 9/2000 Saneyoshi ............... G06T 7/11
348/E13.064
2001/0028729 A1* 10/2001 Nishigaki ............ G06V 10/255
382/104
(Continued)

FOREIGN PATENT DOCUMENTS

CN 109691092 A 4/2019
DE 10115080 A1 11/2001
(Continued)

OTHER PUBLICATIONS

English Translation of Morimitsu JP2008064628A Description (Year: 2008).*
(Continued)

*Primary Examiner* — Tarifur R Chowdhury
*Assistant Examiner* — Akbar H. Rizvi
(74) *Attorney, Agent, or Firm* — CHIP LAW GROUP

(57) ABSTRACT

A distance measurement device according to the present disclosure includes: a light detection unit that receives light from a subject; a depth calculation section that calculates depth information of the subject on the basis of an output of the light detection unit; and an artifact removal section that divides an image into respective segments on the basis of the depth information and validates a segment of the respective segments in which a number of pixels exceeds a predeter-
(Continued)

mined threshold and invalidates a segment in which the number of pixels is less than or equal to the predetermined threshold.

7 Claims, 12 Drawing Sheets

(51) Int. Cl.
  *G01C 3/06* (2006.01)
  *G01S 17/89* (2020.01)

(56) References Cited

U.S. PATENT DOCUMENTS

| | | | | |
|---|---|---|---|---|
| 2011/0063437 | A1* | 3/2011 | Watanabe | G01S 7/4802 |
| | | | | 348/140 |
| 2012/0177252 | A1* | 7/2012 | Korekado | G01S 17/894 |
| | | | | 382/106 |
| 2014/0049767 | A1 | 2/2014 | Benedetti et al. | |
| 2018/0025196 | A1* | 1/2018 | Todeschini | G06K 7/10792 |
| | | | | 235/472.01 |
| 2018/0084240 | A1 | 3/2018 | Campbell et al. | |
| 2018/0203123 | A1* | 7/2018 | Masuda | G06T 7/11 |

FOREIGN PATENT DOCUMENTS

| | | |
|---|---|---|
| EP | 0874331 A2 | 10/1998 |
| JP | 10-285582 A | 10/1998 |
| JP | 2001-273494 A | 10/2001 |
| JP | 2008064628 A * | 3/2008 |
| JP | 2011-128756 A | 6/2011 |
| JP | 2014-056494 A | 3/2014 |
| JP | 2016-035398 A | 3/2016 |
| JP | 2017-219385 A | 12/2017 |
| WO | 2018/052534 A1 | 3/2018 |

OTHER PUBLICATIONS

International Search Report and Written Opinion of PCT Application No. PCT/JP2020/027983, issued on Oct. 13, 2020, 12 pages of ISRWO.

* cited by examiner

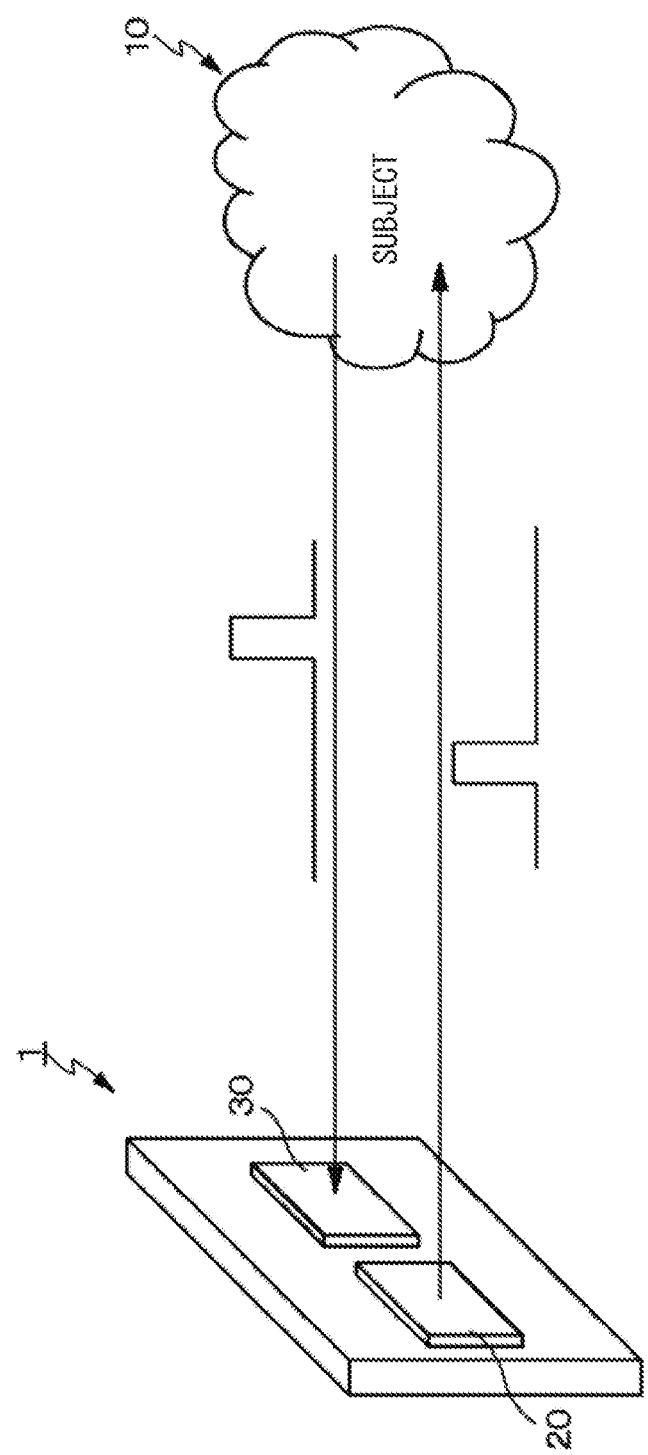
[FIG. 1]

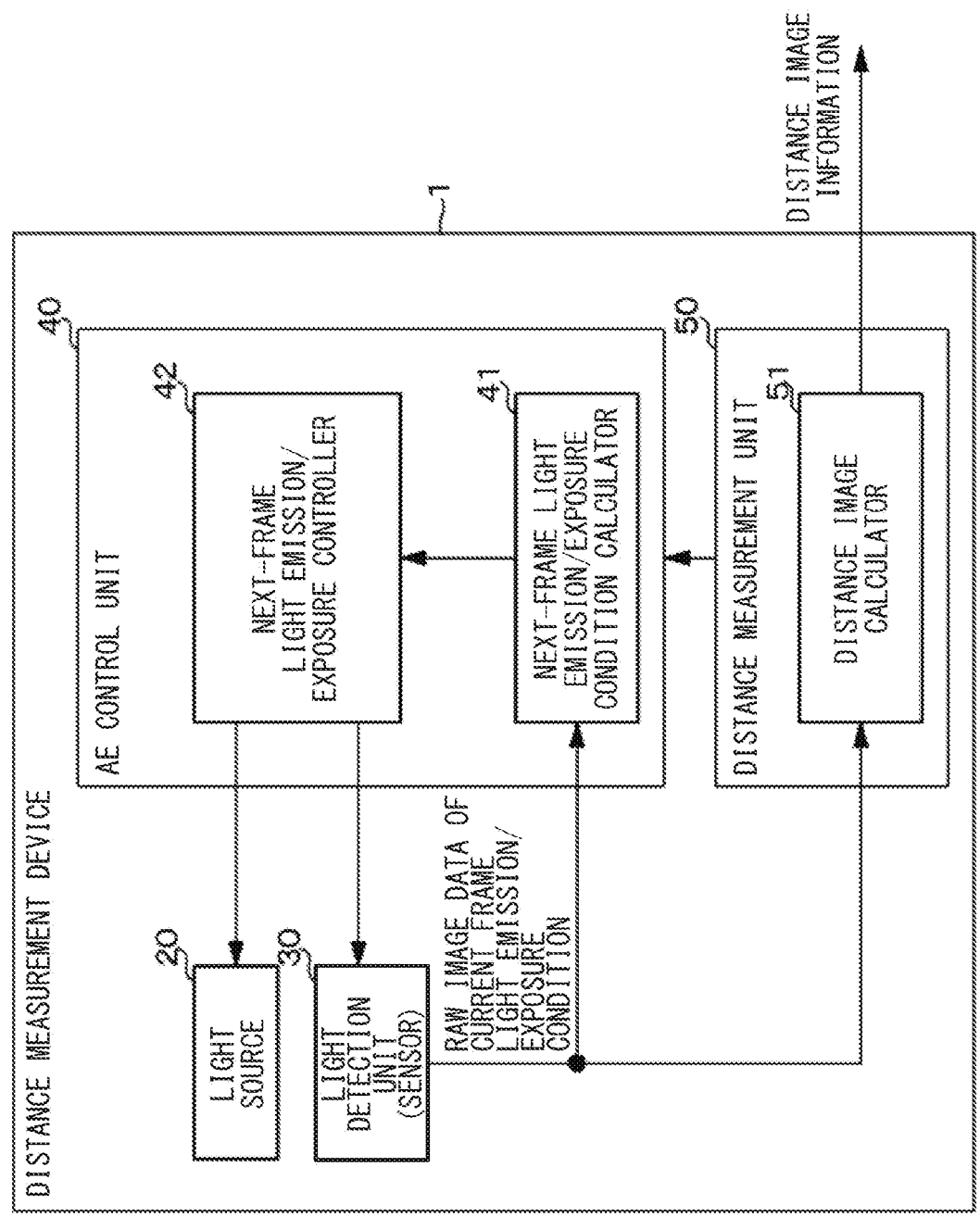
[FIG. 2]

[FIG. 3]
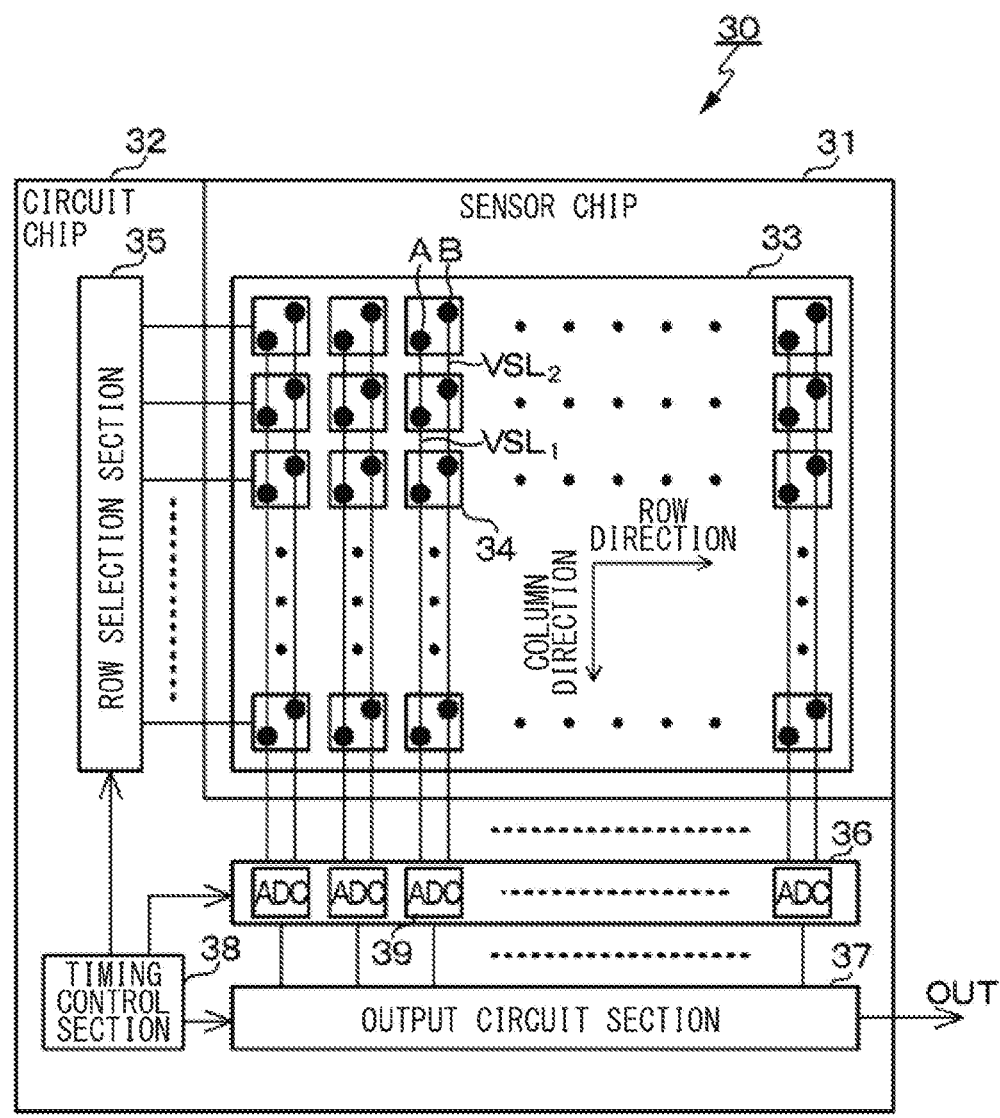

[FIG. 4]
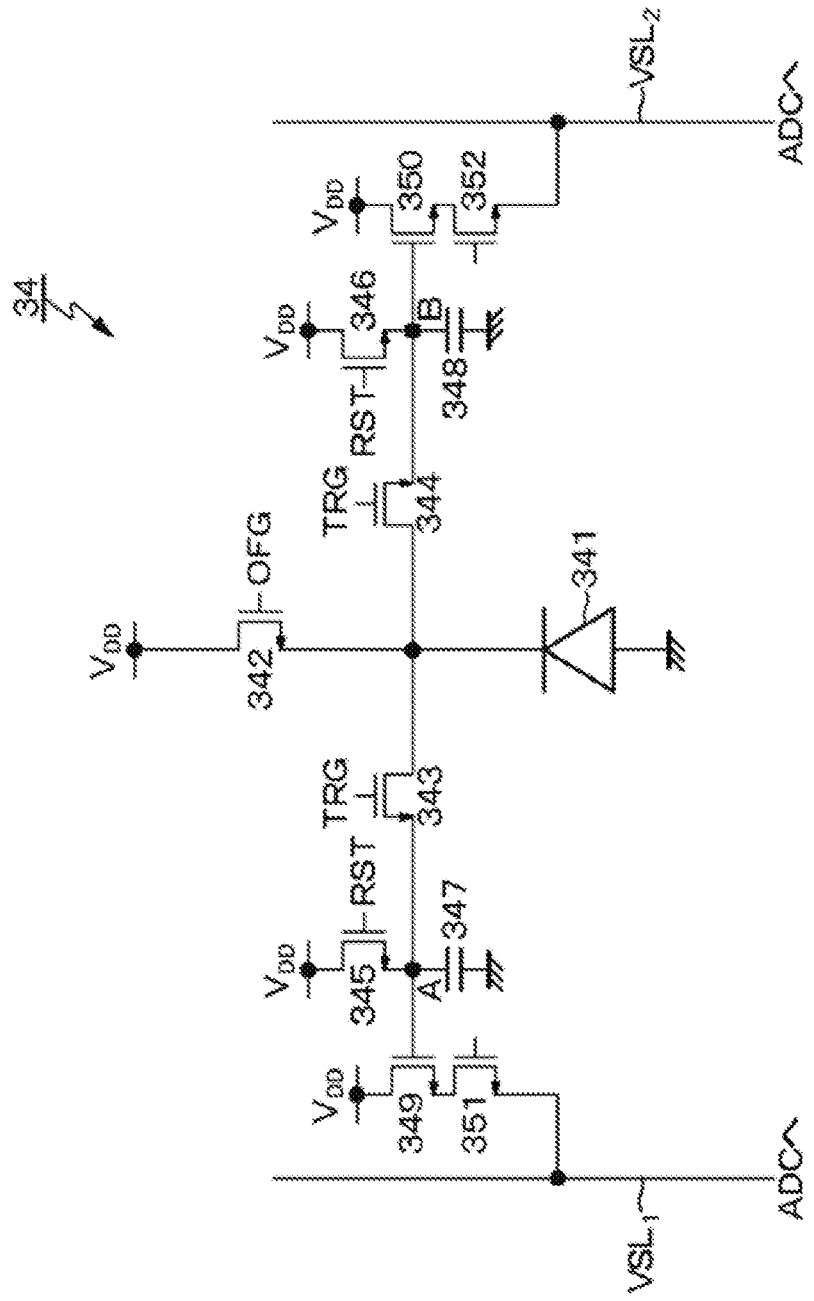

[FIG. 5]
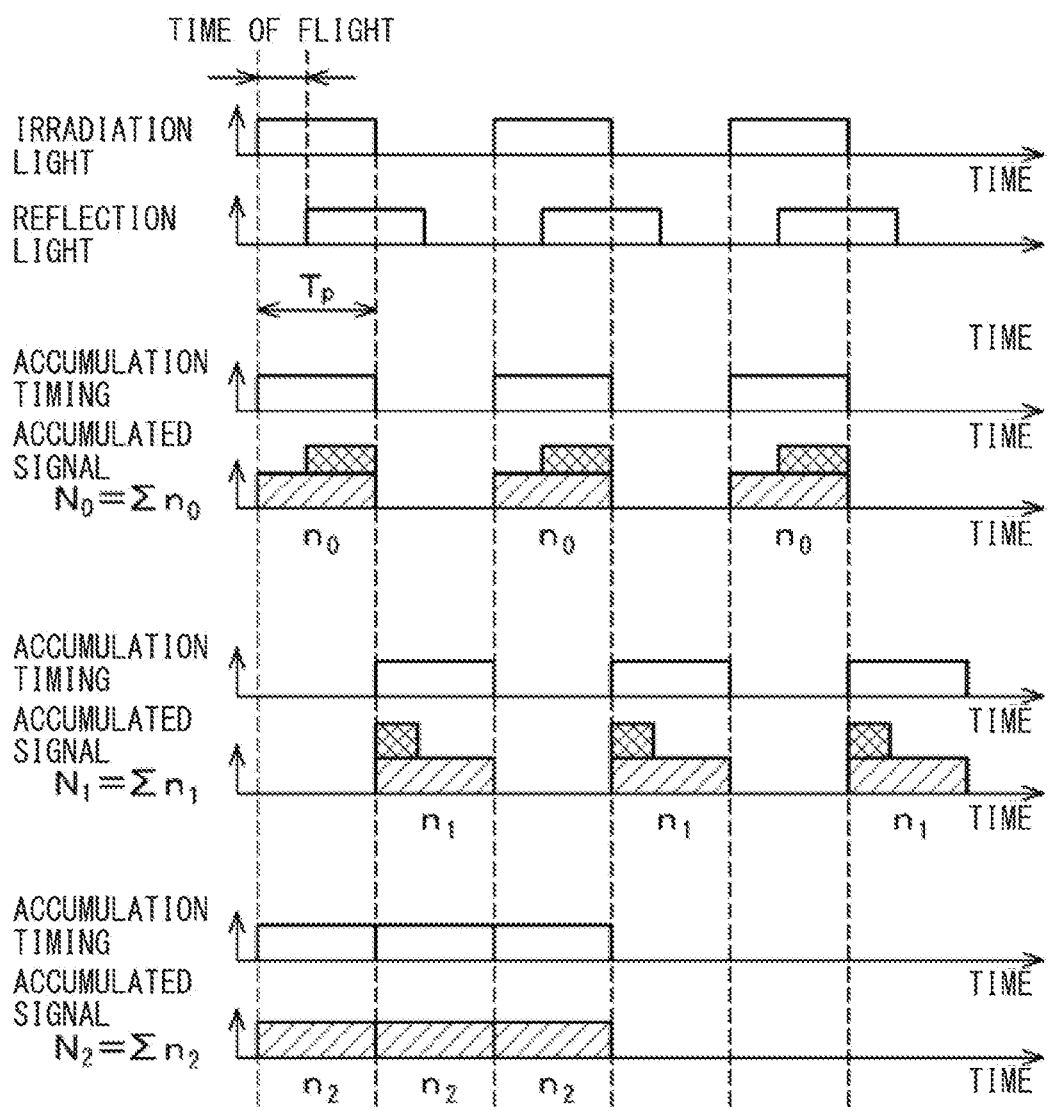

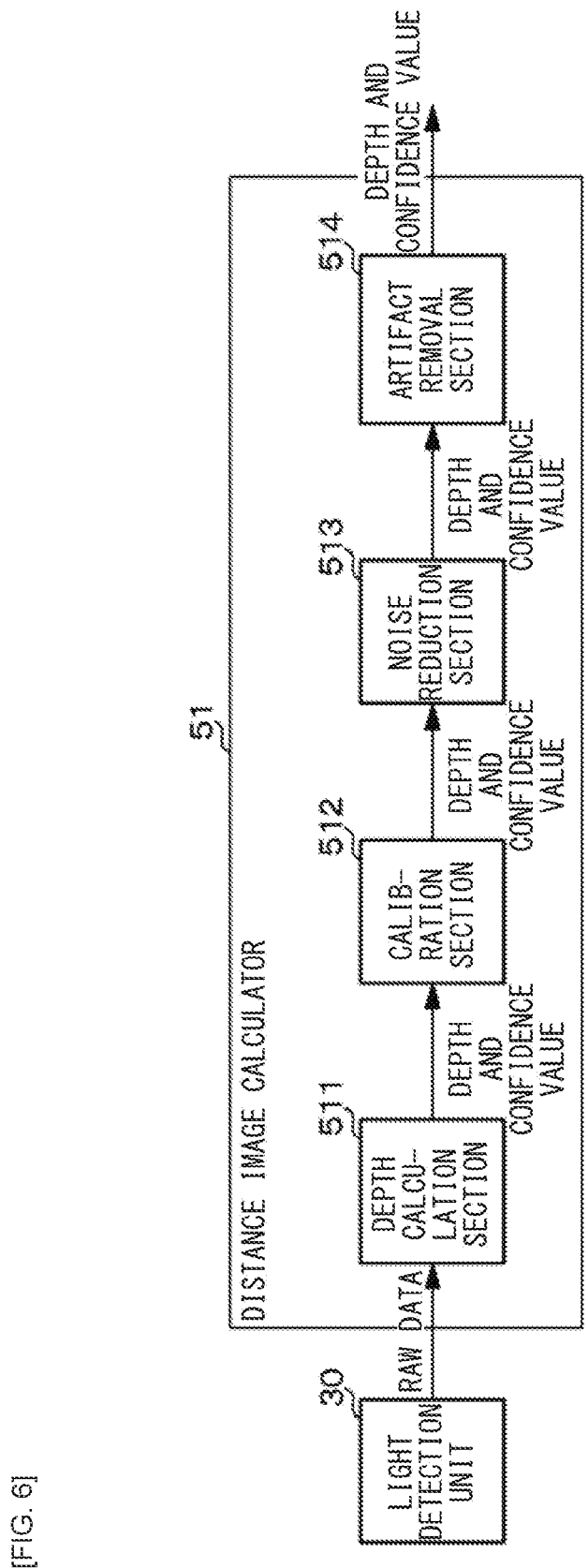
[FIG. 6]

[FIG. 7]
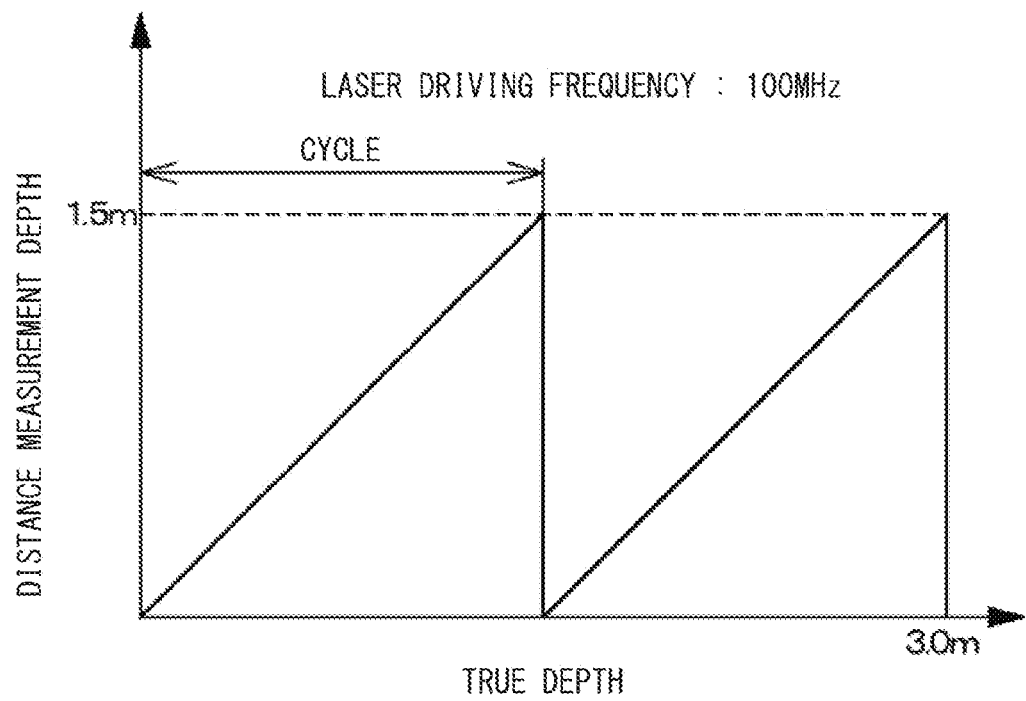

[FIG. 8A]
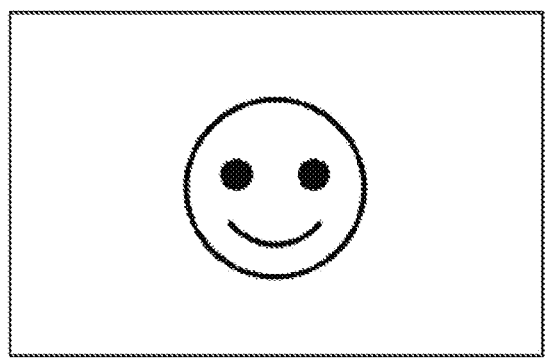
[FIG. 8B]
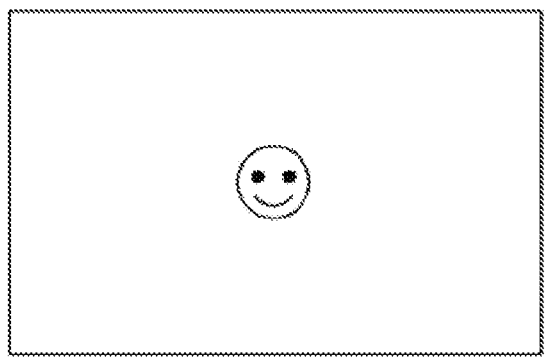

[FIG. 9]
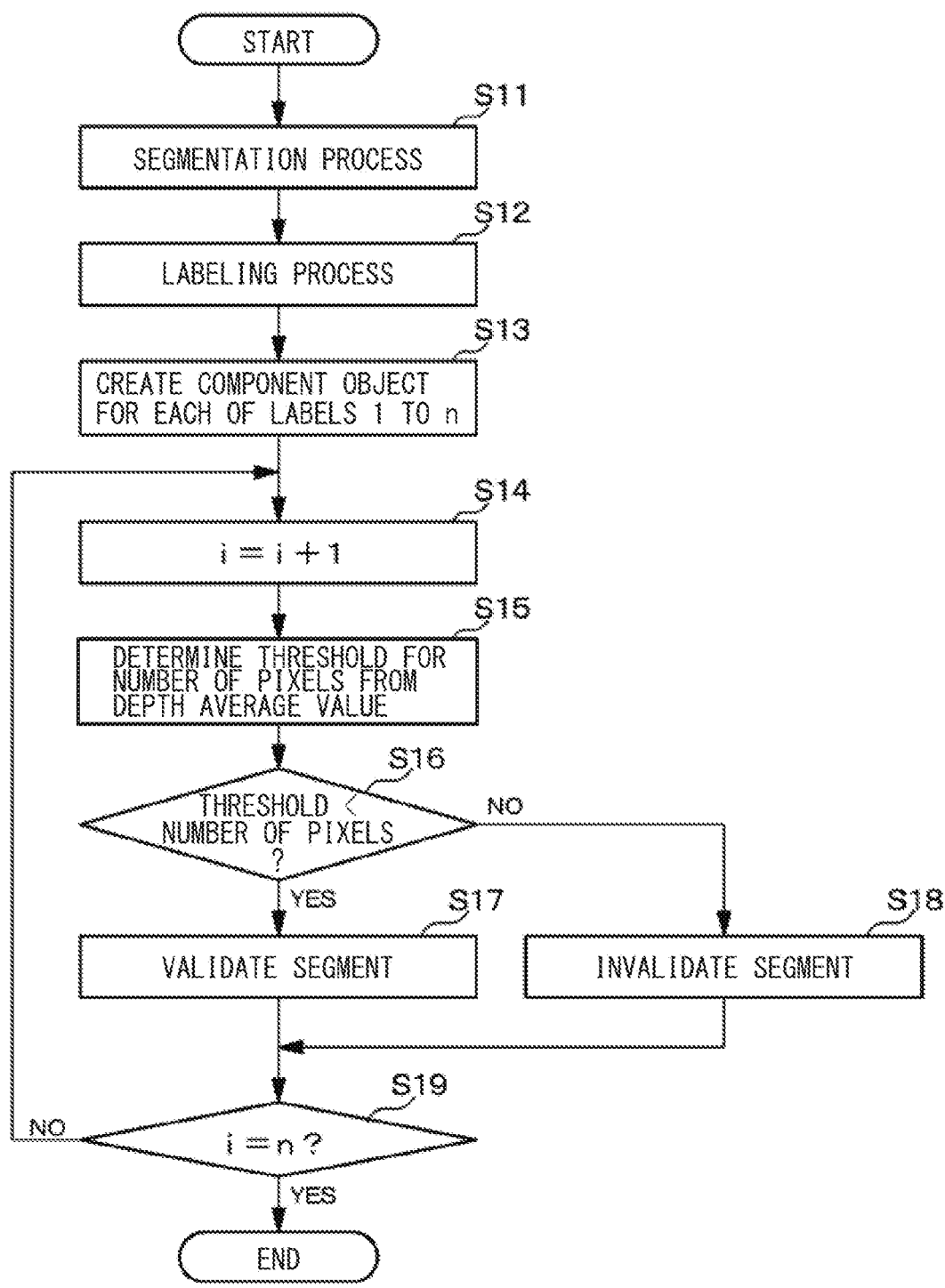

[FIG. 10]
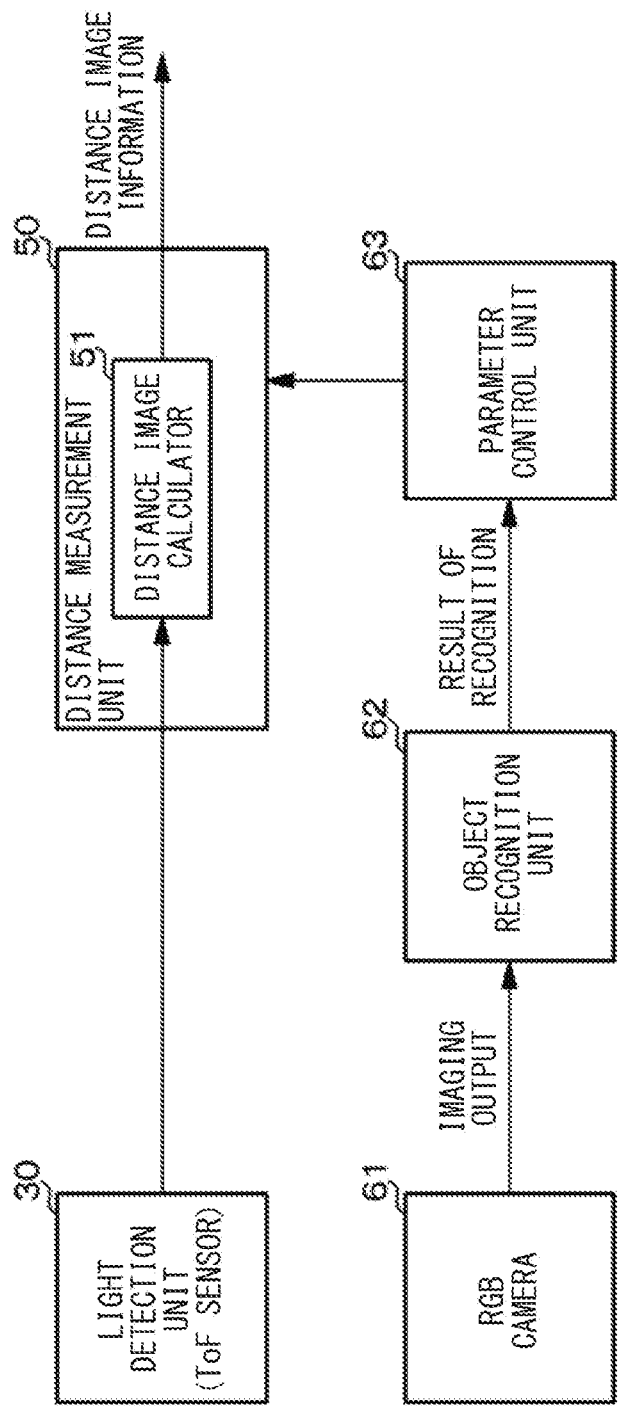

[FIG. 11A]
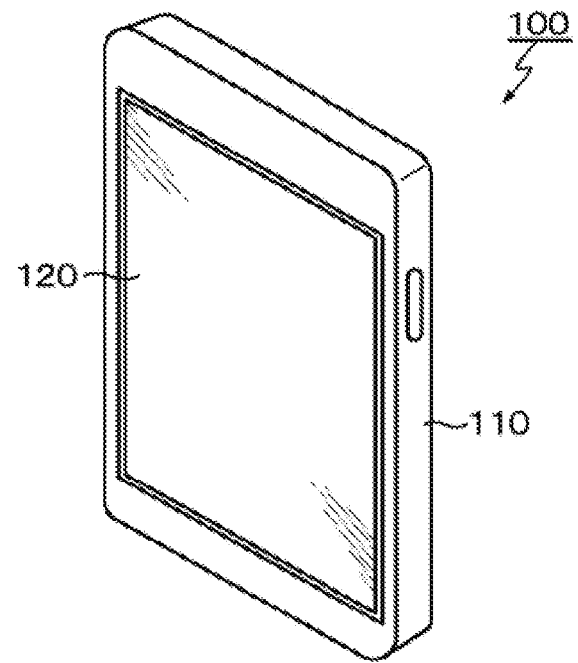
[FIG. 11B]
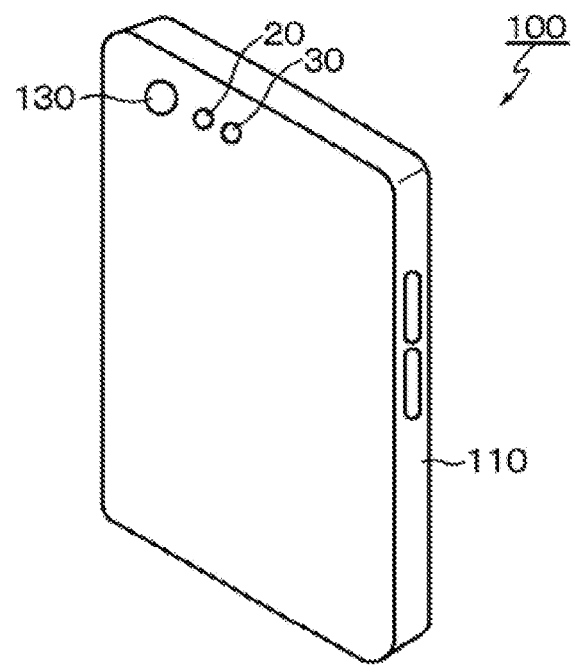

[FIG. 12A]
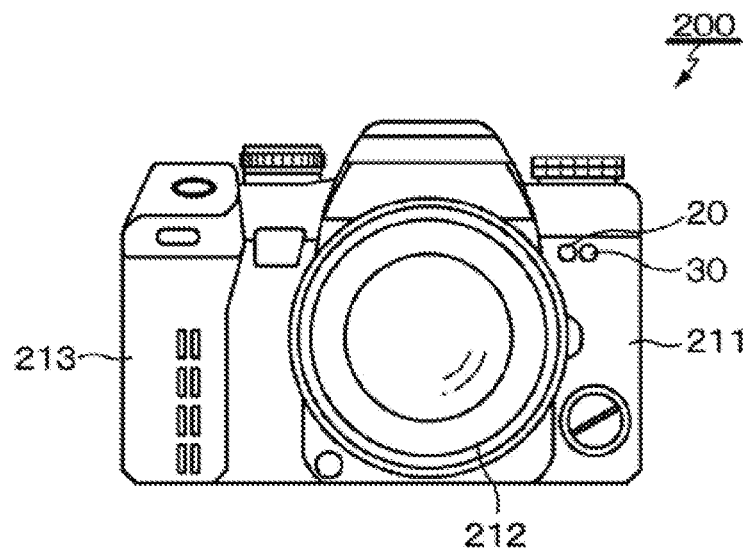
[FIG. 12B]
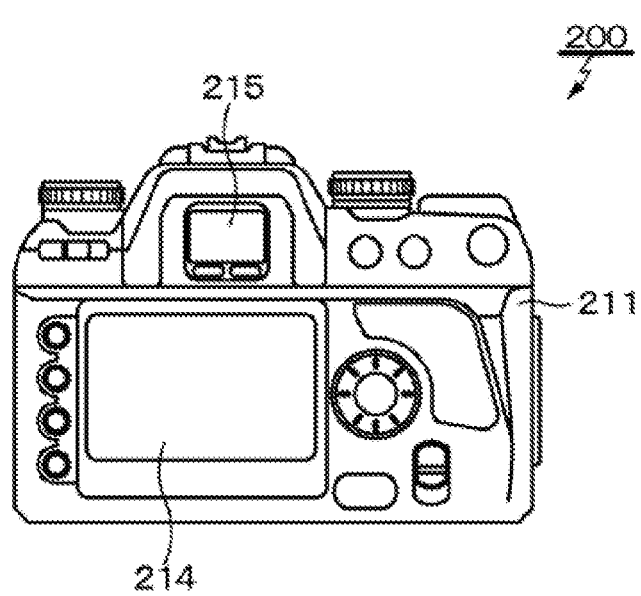

DISTANCE MEASUREMENT DEVICE, METHOD OF CONTROLLING DISTANCE MEASUREMENT DEVICE, AND ELECTRONIC APPARATUS

CROSS REFERENCE TO RELATED APPLICATIONS

This application is a U.S. National Phase of International Patent Application No. PCT/JP2020/027983 filed on Jul. 20, 2020, which claims priority benefit of Japanese Patent Application No. JP 2019-173696 filed in the Japan Patent Office on Sep. 25, 2019. Each of the above-referenced applications is hereby incorporated herein by reference in its entirety.

TECHNICAL FIELD

The present disclosure relates to a distance measurement device, a method of controlling a distance measurement device, and an electronic apparatus.

BACKGROUND ART

Distance measurement devices (distance measuring devices), each of which acquires distance information (distance image information) regarding the distance to a subject include devices (sensors), each of which uses a ToF (Time of Flight: time of flight) method. The ToF method is a method of measuring the distance to a subject (measurement target) by radiating light toward the subject from a light source and detecting the time of flight elapsed before the irradiation light is reflected and returned to the light detection unit by the subject.

One of ToF methods is an indirect (indirect) ToF method of measuring the distance to a subject by detecting a cycle in which pulse light having a predetermined cycle that is emitted from a light source is reflected by the subject and the reflection light is received by a light detection unit, and measuring the time of flight from the phase difference between the light emission cycle and the light reception cycle (e.g., see PTL 1).

CITATION LIST

Patent Literature

PTL 1: Japanese Unexamined Patent Application Publication No. 2016-035398

SUMMARY OF THE INVENTION

Problems to be Solved by the Invention

An indirect ToF distance measurement device determines the maximum distance that is measurable in accordance with the light emission frequency (light emission cycle) of laser light emitted from a light source. However, in a case where the maximum distance is exceeded, aliasing distortion (folded distance) occurs that is referred to as aliasing. The actual measurement distance of an object at the distance (alias distance) at which aliasing occurs is then shorter than the original correct distance (true distance). This causes a result of the distance measurement of the object at the alias distance to be outputted as a result of incorrect distance measurement. The subsequent system that performs various kinds of control on the basis of the result of the distance measurement performs incorrect control.

An object of the present disclosure is to provide a distance measurement device which is able to invalidate a result of the distance measurement of an object at the alias distance and output only a result of the distance measurement of an object whose correct distance (true distance) is measured, a method of controlling a distance measurement device, and an electronic apparatus including the distance measurement device.

Means for Solving the Problems

A distance measurement device according to the present disclosure for achieving the object described above includes: a light detection unit that receives light from a subject; a depth calculation section that calculates depth information of the subject on the basis of an output of the light detection unit; and an artifact removal section that divides an image into segments on the basis of the depth information calculated by the depth calculation section, validates a segment of the respective segments in which a number of pixels exceeds a predetermined threshold, and invalidates a segment in which the number of pixels is less than or equal to the predetermined threshold.

A method of controlling a distance measurement device according to the present disclosure for achieving the object described above includes dividing—in the distance measurement device including a light detection unit that receives light from a subject, and a depth calculation section that calculates depth information of the subject on the basis of an output of the light detection unit—an image into segments on the basis of the depth information, validating a segment of the respective segments in which a number of pixels exceeds a predetermined threshold, and invalidating a segment in which the number of pixels is less than or equal to the predetermined threshold.

In addition, an electronic apparatus according to the present disclosure to achieve the object described above includes a distance measurement device having the configuration described above.

BRIEF DESCRIPTION OF DRAWING

FIG. 1 is a conceptual diagram of a ToF distance measurement system.

FIG. 2 is a block diagram illustrating an example of a configuration of a ToF distance measurement device to which technology according to the present disclosure is applied.

FIG. 3 is a block diagram illustrating an example of a configuration of a light detection unit in the distance measurement device.

FIG. 4 is a circuit diagram illustrating an example of a circuit configuration of a pixel in the light detection unit.

FIG. 5 is a timing waveform chart for describing calculation of distance by the ToF distance measurement device.

FIG. 6 is a block diagram illustrating an example of a configuration of a distance image calculator of the distance measurement unit in the distance measurement device.

FIG. 7 is a diagram illustrating a relationship between true depth and distance measurement depth at a laser driving frequency of 100 MHz.

FIG. 8A is a diagram illustrating a size of a subject appearing in an image at a true depth of 1.0 m and a distance measurement depth of 1.0 m and FIG. 8B is a diagram illustrating a size of a subject appearing in an image at a true depth of 2.5 m and a distance measurement depth of 1.0 m.

FIG. 9 is a flowchart illustrating an example of a process for solving an aliasing problem that is executed by a distance measurement device according to an embodiment of the present disclosure.

FIG. 10 is a block diagram illustrating a modification example of the embodiment of the present disclosure.

FIG. 11A is an external view of a smartphone according to a specific example 1 of an electronic apparatus according to the present disclosure from a front side and FIG. 11B is an external view from a back side.

FIG. 12A is an external view of a digital still camera according to a specific example 2 of the electronic apparatus according to the present disclosure from a front side and FIG. 12B is an external view from a back side.

MODES FOR CARRYING OUT THE INVENTION

The following describes modes for carrying out the technology according to the present disclosure (referred to as "embodiments" below) in detail with reference to the drawings. The technology according to the present disclosure is not limited to the embodiments, but a variety of numerical values and the like in the embodiments are examples. In the following description, the same elements or elements having the same functions are denoted by the same signs and redundant description is omitted. It is to be noted that the description is given in the following order.

1. General Description of Distance Measurement Device and Electronic Apparatus According to the Present Disclosure
2. ToF Distance Measurement System
3. Distance Measurement Device to which Technology According to the Present Disclosure is Applied
3-1. System Configuration
3-2. Configuration Example of Light Detection Unit
3-3. Circuit Configuration Example of Pixel
3-4. Configuration Example of Distance Image Calculator
3-5. Regarding Aliasing Problem
4. Embodiment of the Present Disclosure
4-1. Example of Process for Solving Aliasing Problem
4-2. Setting of Threshold for Number of Pixels in Segment
5. Modification Example
6. Practical Application Example
7. Electronic Apparatus according to the Present Disclosure
7-1. Specific Example 1 (Example of Smartphone)
7-2. Specific Example 2 (Example of Digital Still Camera)
8. Configuration Adoptable by the Present Disclosure <General Description of Distance Measurement Device and Electronic Apparatus According to the Present Disclosure>

It is possible in a distance measurement device and an electronic apparatus according to the present disclosure to configure an artifact removal section to attach labels to respective segments and create a component object for each of the labels. In addition, it is possible to configure the artifact removal section to attach different labels to the respective segments by a process of attaching the same label to a pixel having depth information continuous to the depth information of a nearby pixel. In addition, it is possible to configure the component object to include the number of pixels and the depth average value of the segment.

It is possible in the distance measurement device and the electronic apparatus according to the present disclosure each having the preferable configuration described above to configure the artifact removal section to change a predetermined threshold in accordance with the distance of the segment from the distance measurement device. In addition, it is possible to configure the artifact removal section to set a large threshold for short distance and set a small threshold for long distance. The short distance indicates that the distance of the segment from the distance measurement device is relatively short. The long distance indicates that the distance of the segment from the distance measurement device is relatively long.

<ToF Distance Measurement System>

FIG. 1 is a conceptual diagram of a ToF distance measurement system. A distance measurement device 1 according to this example adopts a ToF method as a measurement method of measuring the distance to a subject 10 that is a measurement target. The ToF method is a method of measuring the time elapsed before light radiated toward the subject 10 is reflected and returned by the subject 10. To achieve distance measurement in the ToF method, the distance measurement device 1 includes a light source 20 that emits light (e.g., laser light having a peak wavelength in an infrared wavelength region) to be irradiated toward the subject 10 and a light detection unit 30 that detects the reflection light reflected and returned by the subject 10.

<Distance Measurement Device to which Technology According to the Present Disclosure is Applied>

[System Configuration]

FIG. 2 is a block diagram illustrating an example of a configuration of a ToF distance measurement device to which the technology according to the present disclosure is applied. The distance measurement device 1 (i.e., the distance measurement device 1 according to the present disclosure) according to this application example includes an AE (Automatic Exposure: automatic exposure) control unit 40 that performs exposure control on the basis of a signal value outputted by the light detection unit 30 and a distance measurement unit 50 in addition to the light source 20 and the light detection unit 30. The ToF distance measurement device 1 according to this application example is then able to detect distance information for each of the pixels of the light detection unit 30 and acquire a distance image (Depth Map: depth map) with high accuracy in units of imaging frames.

The distance measurement device 1 according to this application example is an indirect (Indirect) ToF distance measurement device (a so-called indirect ToF distance image sensor). The indirect ToF distance measurement device 1 detects a cycle in which pulse light having a predetermined cycle that is emitted from the light source 20 is reflected by a measurement target (subject) and the reflection light is received by the light detection unit 30. The distance to the measurement target is then measured by measuring the time of flight from the phase difference between the light emission cycle and the light reception cycle.

The light source 20 radiates light toward a measurement target by repeating on/off operations in predetermined cycles under the control of the AE control unit 40. For example, near-infrared light around 850 nm is used in many cases as irradiation light of the light source 20. The light detection unit 30 receives the light obtained in a case where the irradiation light from the light source 20 is reflected and returned by the measurement target and detects distance information for each of the pixels. The light detection unit 30 outputs the RAW image data of the current frame including the distance information detected for each of the pixels and light emission/exposure setting information. The RAW image data and the light emission/exposure setting information are supplied to the AE control unit 40 and the distance measurement unit 50.

The AE control unit 40 includes a next-frame light emission/exposure condition calculator 41 and a next-frame light emission/exposure controller 42. The next-frame light emission/exposure condition calculator 41 calculates the light emission/exposure conditions of the next frame on the basis of the RAW image data of the current frame and the light emission/exposure setting information supplied from the light detection unit 30. The light emission/exposure conditions of the next frame are the light emission time and the light emission intensity of the light source 20 and the exposure time of the light detection unit 30 for acquiring a distance image of the next frame. The next-frame light emission/exposure controller 42 controls the light emission time and the light emission intensity of the light source 20 and the exposure time of the light detection unit 30 for the next frame on the basis of the light emission/exposure conditions of the next frame calculated by the next-frame light emission/exposure condition calculator 41.

The distance measurement unit 50 includes a distance image calculator 51 that calculates a distance image. The distance image calculator 51 calculates a distance image by making a calculation with the RAW image data of the current frame including distance information detected for each of the pixels of the light detection unit 30 and makes an output to the outside of the distance measurement device 1 as distance image information including the respective pieces of information of depth that is deepness information of the subject and a confidence value that is light reception information of the light detection unit 30. Here, the distance image is an image in which a distance value (depth/value of deepness), for example, based on distance information detected for each of the pixels is reflected in the pixel.

[Configuration Example of Light Detection Unit]

Here, a specific configuration example of the light detection unit 30 is described with reference to FIG. 3. FIG. 3 is a block diagram illustrating an example of a configuration of the light detection unit 30.

The light detection unit 30 has a stacked structure including a sensor chip 31 and a circuit chip 32 stacked on the sensor chip 31. In this stacked structure, the sensor chip 31 and the circuit chip 32 are electrically coupled through a coupling section (not illustrated) such as a via (VIA) or a Cu—Cu junction. It is to be noted that FIG. 3 illustrates that a wiring line of the sensor chip 31 and a wiring line of the circuit chip 32 are electrically coupled through the coupling section described above.

A pixel array section 33 is formed on the sensor chip 31. The pixel array section 33 includes a plurality of pixels 34 disposed on the sensor chip 31 in a matrix (in an array) to form a two-dimensional grid pattern. In the pixel array section 33, each of the plurality of pixels 34 receives incident light (e.g., near-infrared light), performs photoelectric conversion, and outputs an analog pixel signal. The pixel array section 33 is provided with two vertical signal lines $VSL_1$ and $VSL_2$ for each of the pixel columns. In a case where M (M is an integer) represents the number of pixel columns of the pixel array section 33, the pixel array section 33 is provided with the (2×M) vertical signal lines VSL in total.

Each of the plurality of pixels 34 includes a first tap A and a second tap B (described in detail below). The vertical signal line $VSL_1$ of the two vertical signal lines $VSL_1$ and $VSL_2$ receives an analog pixel signal $AIN_{P1}$ based on the electric charge of the first tap A of each of the pixels 34 in the corresponding pixel column. In addition, the vertical signal line $VSL_2$ receives an analog pixel signal $AIN_{P2}$ based on the electric charge of the second tap B of each of the pixels 34 in the corresponding pixel column. The analog pixel signals $AIN_{P1}$ and $AIN_{P2}$ are described below.

A row selection section 35, a column signal processing section 36, an output circuit section 37, and a timing control section 38 are disposed on the circuit chip 32. The row selection section 35 drives the respective pixels 34 of the pixel array section 33 in units of pixel rows and causes the pixel signals $AIN_{P1}$ and $AIN_{P2}$ to be outputted. The analog pixel signals $AIN_{P1}$ and $AIN_{P2}$ outputted from the pixels 34 in the selected row that are driven by the row selection section 35 are supplied to the column signal processing section 36 through the two vertical signal lines $VSL_1$ and $VSL_2$.

The column signal processing section 36 includes, for example, a plurality of analog-digital converters (ADCs) 39 provided to the respective pixel columns in association with the pixel columns of the pixel array section 33. Each of the analog-digital converters 39 performs an analog-digital conversion process on the analog pixel signals $AIN_{P1}$ and $AIN_{P2}$ supplied through the vertical signal lines $VSL_1$ and $VSL_2$ and makes outputs to the circuit section 37. The output circuit section 37 executes a CDS (Correlated Double Sampling: correlated double sampling) process or the like on the digitized pixel signals $AIN_{P1}$ and $AIN_{P2}$ outputted from the column signal processing section 36 and makes outputs to the outside of the circuit chip 32.

The timing control section 38 generates a variety of timing signals, clock signals, control signals, and the like. The timing control section 38 controls the driving of the row selection section 35, the column signal processing section 36, the output circuit section 37, and the like on the basis of these signals.

[Circuit Configuration Example of Pixel]

FIG. 4 is a circuit diagram illustrating an example of a circuit configuration of the pixel 34 in the light detection unit 30.

The pixel 34 according to this example includes, for example, a photodiode 341 as a photoelectric converter. The pixel 34 includes an overflow transistor 342, two transfer transistors 343 and 344, two reset transistors 345 and 346, two floating diffusion layers 347 and 348, two amplification transistors 349 and 350, and two selection transistors 351 and 352 in addition to the photodiode 341. The two floating diffusion layers 347 and 348 correspond to the first and second taps A and B (that are sometimes referred to simply as "taps A and B" below) illustrated in FIG. 3 described above.

The photodiode 341 photoelectrically converts the received light to generate electric charge. It is possible to adopt, for example, a back-illuminated pixel structure for the photodiode 341 in which light radiated from the back side of the substrate is captured. The pixel structure is not, however, limited to a back-illuminated pixel structure, but it is also possible to adopt a front-illuminated pixel structure in which light radiated from the front side of the substrate is captured.

The overflow transistor 342 is coupled between the cathode electrode of the photodiode 341 and the power supply line of a power supply voltage $V_{DD}$ and has a function of resetting the photodiode 341. Specifically, the overflow transistor 342 enters a conduction state in response to an overflow gate signal OFG supplied from the row selection section 35. This causes the overflow transistor 342 to sequentially discharge the electric charge of the photodiode 341 to the power supply line of the power supply voltage $V_{DD}$.

The two transfer transistors 343 and 344 are respectively coupled between the cathode electrode of the photodiode 341 and the two floating diffusion layers 347 and 348 (taps A and B). Each of the transfer transistors 343 and 344 then enters a conduction state in response to a transfer signal TRG supplied from the row selection section 35. This causes the transfer transistors 343 and 344 to sequentially transfer the electric charge generated by the photodiode 341 to the floating diffusion layers 347 and 348, respectively.

The floating diffusion layers 347 and 348 corresponding to the first and second taps A and B accumulate the electric charge transferred from the photodiode 341, perform conversion to voltage signals each having the voltage value corresponding to the amount of electric charge, and generate the analog pixel signals $AIN_{P1}$ and $AIN_{P2}$.

The two reset transistors 345 and 346 are respectively coupled between the two floating diffusion layers 347 and 348 and the power supply line of the power supply voltage $V_{DD}$. Each of the reset transistors 345 and 346 then enters a conduction state in response to a reset signal RST supplied from the row selection section 35. This causes the reset transistors 345 and 346 to respectively pull out the electric charge from the floating diffusion layers 347 and 348 and initialize the amount of electric charge.

The two amplification transistors 349 and 350 are respectively coupled between the power supply line of the power supply voltage $V_{DD}$ and the two selection transistors 351 and 352. The amplification transistors 349 and 350 amplify voltage signals resulting from conversion from electric charge to voltages by the respective floating diffusion layers 347 and 348.

The two selection transistors 351 and 352 are respectively coupled between the two amplification transistors 349 and 350 and the vertical signal lines $VSL_1$ and $VSL_2$. Each of the selection transistors 351 and 352 then enters a conduction state in response to a selection signal SEL supplied from the row selection section 35. This causes the selection transistors 351 and 352 to output voltage signals amplified by the respective amplification transistors 349 and 350 to the two vertical signal lines $VSL_1$ and $VSL_2$ as the analog pixel signals $AIN_{P1}$ and $AIN_{P2}$.

The two vertical signal lines $VSL_1$ and $VSL_2$ are coupled to the input end of the one analog-digital converter 39 in the column signal processing section 36 for each of the pixel columns. The vertical signal lines $VSL_1$ and $VSL_2$ transmit the analog pixel signals $AIN_{P1}$ and $AIN_{P2}$ to the analog-digital converter 39. The analog pixel signals $AIN_{P1}$ and $AIN_{P2}$ are outputted from the pixels 34 for each of the pixel columns.

It is to be noted that the circuit configuration of each of the pixels 34 is not limited to the circuit configuration illustrated in FIG. 3 as long as the circuit configuration allows the analog pixel signals $AIN_{P1}$ and $AIN_{P2}$ to be generated by photoelectric conversion.

Here, the calculation of distance in the ToF method is described with reference to FIG. 5. FIG. 5 is a timing waveform chart for describing the calculation of distance by the ToF distance measurement device 1. The light source 20 and the light detection unit 30 in the ToF distance measurement device 1 each come into operation at a timing illustrated in the timing waveform chart of FIG. 5.

The light source 20 irradiates a measurement target with light for a predetermined period under the control of the AE control unit 40. The predetermined period is, for example, the period of the pulse light emission time $T_P$. The irradiation light emitted from the light source 20 is reflected and returned by the measurement target. This reflection light (active light) is received by the photodiode 341. The time from the start of the irradiation of the measurement target with the irradiation light to the reception of the reflection light by the photodiode 341, that is, the time of flight, is the time corresponding to the distance from the distance measurement device 1 to the measurement target.

In FIG. 4, the photodiode 341 receives reflection light from a measurement target for the pulse light emission time $T_P$ from the time point to start to radiate irradiation light. In this case, the light received by the photodiode 341 also includes ambient light (ambient light) reflected/scattered by an object, the atmosphere, and the like in addition to the reflection light (active light) obtained in a case where the light radiated to the measurement target is reflected and returned by the measurement target.

In a case where light is received one time, the electric charge resulting from photoelectric conversion by the photodiode 341 is transferred to the tap A (floating diffusion layer 347) and accumulated. A signal $n_0$ having the voltage value corresponding to the amount of electric charge accumulated in the floating diffusion layer 347 is then acquired from the tap A. At a time point when the accumulation timing of the tap A is finished, the electric charge resulting from photoelectric conversion by the photodiode 341 is transferred to the tap B (floating diffusion layer 348) and accumulated. A signal $n_1$ having the voltage value corresponding to the amount of electric charge accumulated in the floating diffusion layer 348 is then acquired from the tap B.

In this way, the tap A and the tap B are driven by shifting the phases of the accumulation timings by 180 degrees (driven by completely inverting the phases), thereby acquiring the signal $n_0$ and the signal $n_1$, respectively. Such driving is then repeated a plurality of times and the signals $n_0$ and the signals $n_1$ are accumulated and integrated, thereby acquiring an accumulated signal $N_0$ and an accumulated signal $N_1$, respectively.

For example, the one pixel 34 receives light two times within one phase. Signals are accumulated in the tap A and the tap B four times: 0 degrees; 90 degrees; 180 degrees; and 270 degrees. Distance D from the distance measurement device 1 to the measurement target is calculated on the basis of the accumulated signal $N_0$ and the accumulated signal $N_1$ acquired in this way.

Each of the accumulated signal $N_0$ and the accumulated signal $N_1$ also includes the component of ambient light (ambient light) reflected/scattered by an object, the atmosphere, and the like in addition to the component of reflection light (active light) reflected and returned by a measurement target. Thus, to exclude the influence of this component of ambient light (ambient light) and keep the component of the reflection light (active light), signals $n_2$ based on the ambient light are also accumulated and integrated and an accumulated signal $N_2$ for the ambient light component is acquired in the operation described above.

The use of the accumulated signal $N_0$ and the accumulated signal $N_1$ each including an ambient light component and the accumulated signal $N_2$ for the ambient light component acquired in this way allows the arithmetic processing based on the following equation (1) and equation (2) to calculate the distance D from the distance measurement device 1 to a measurement target.

[Math. 1]

$$\Delta\phi = \frac{N_0 - N_2}{N_0 + N_1 - 2 \cdot N_2} \quad \ldots \quad (1)$$

[Math. 2]

$$D = \frac{c \cdot T_p}{2}\left(1 - \frac{\Delta\phi}{2\pi}\right) \quad \ldots \quad (2)$$

In the equation (1) and the equation (2), D represents the distance from the distance measurement device 1 to a measurement target, c represents the speed of light, and $T_p$ represents pulse light emission time.

The distance image calculator 51 illustrated in FIG. 2 calculates the distance D, which is outputted from the light detection unit 30, from the distance measurement device 1 to a measurement target through the arithmetic processing based on the equation (1) and the equation (2) described above by using the accumulated signal $N_0$ and the accumulated signal $N_1$ each including an ambient light component and the accumulated signal $N_2$ for the ambient light component and makes an output as distance image information. For example, it is possible to exemplify image information colored with a color having the density corresponding to the distance D as the distance image information. It is to be noted that the calculated distance D is outputted here as distance image information, but the calculated distance D may also be outputted as distance information with no process.

[Configuration Example of Distance Image Calculator]

FIG. 6 illustrates an example of a configuration of the distance image calculator 51 of the distance measurement unit 50 in the distance measurement device 1. The distance image calculator 51 according to this example includes a depth calculation section 511, a calibration section 512, a noise reduction section 513, and an artifact removal section 514.

In the distance image calculator 51 having the configuration described above, the depth calculation section 511 calculates, by using RAW image data provided from the light detection unit 30, depth information and confidence value information from the phase difference obtained in a case where light emitted from the light source 20 is reflected by a subject and the reflection light arrives at the light detection unit 30. Here, the "depth" is deepness information (distance information) of the subject. The "confidence value" is light reception information of the light detection unit 30 and the amount (degree) of reflection light obtained in a case where the light emitted from the light source 20 is reflected and returned to the light detection unit 30 by the subject.

For example, the calibration section 512 phases light emitted from the light source 20 and light entering the light detection unit 30 with each other and performs a calibration process such as waveform correction and temperature correction. The noise reduction section 513 includes, for example, a low-pass filter and performs a process of reducing noise. The artifact removal section 514 has a variety of filter functions. The artifact removal section 514 performs a process of rejecting information resulting from incorrect distance measurement and information having a low confidence value for the light reception of the light detection unit 30 from the respective pieces of information of depth and confidence values that have passed through the noise reduction section 513.

It is to be noted that the configuration is exemplified here in which the calibration section 512, the noise reduction section 513, and the artifact removal section 514 are disposed in this order, but the calibration section 512, the noise reduction section 513, and the artifact removal section 514 may be disposed in any order. In other words, the order may be changed.

[Regarding Aliasing Problem]

Incidentally, the indirect ToF distance measurement device described above determines the maximum distance that is measurable in accordance with the light emission frequency (light emission cycle) of laser light emitted from the light source 20. As an example, FIG. 7 illustrates the relationship between the true depth and the distance measurement depth in a case where the light source 20 has a laser driving frequency (light emission frequency) of 100 MHz. In a case of this example, the maximum distance that is measurable is 1.5 m.

The indirect ToF distance measurement device uses distance measurement based on a phase difference and one cycle takes the indirect ToF distance measurement device back to the same phase. Aliasing (folded distance) thus occurs in a case where the distance to a subject exceeds the maximum distance that is measurable. The aliasing problem is likely to occur especially in a high-reflectance subject having a large specular reflection component such as metal or glass.

The actual measurement distance (distance measurement depth) of an object at the alias distance (distance at which aliasing occurs) is then shorter than the original correct distance (true depth). For example, the actual measurement distance (distance measurement depth) of a subject at an original correct distance (true depth) of 2.5 m is 1.0 m. In this way, a result of the distance measurement of an object at the alias distance is outputted from the distance measurement device 1 as a result of incorrect distance measurement.

As a result, the subsequent system that performs various kinds of control on the basis of a result (distance image information including depth and a confidence value) of distance measurement of the distance measurement device 1 performs incorrect control on the basis of a result of the incorrect distance measurement of the distance measurement device 1. As an example, in a case where a result of distance measurement of the distance measurement device 1 is applied to autofocus that automatically adjust the focus (focus) of the camera, accurate focus control is not performed.

Here, the size of a subject appearing in an image is studied. FIG. 8A illustrates the size of a subject appearing in an image at a true depth of 1.0 m and a distance measurement depth of 1.0 m and FIG. 8B illustrates the size of a subject appearing in an image at a true depth of 2.5 m and a distance measurement depth of 1.0 m. FIG. 8B is an example of a case of a subject at the alias distance.

Both of cases of FIG. 8A and FIG. 8B have the same 1.0-m distance measurement distance (distance measurement depth). As is apparent from a comparison between FIG. 8A and FIG. 8B, distance is measured as the same 1.0-m distance, but the subject appears different in size. In other words, the subject appears smaller in size in an image at a true depth of 2.5 m (FIG. 8B) than at a true depth of 1.0 m (FIG. 8A). This means that the subject appears different in size in an image in accordance with the distance of the subject from the distance measurement device 1.

<Embodiment of the Present Disclosure>

In an embodiment of the present disclosure, the aliasing problem that is a problem peculiar to the indirect ToF distance measurement device is solved by using the property that the size of a subject appearing in an image changes as described above in accordance with the distance of the subject from the distance measurement device 1. A process to solve this aliasing problem is executed by the artifact removal section 514 in the distance image calculator 51 of the distance measurement unit 50 as one of filter functions in the present embodiment.

[Example of Process for Solving Aliasing Problem]

The following describes an example of a process for solving the aliasing problem that is an example of a process of a method of controlling the distance measurement device according to the present disclosure which is executed by the artifact removal section 514 with reference to the flowchart of FIG. 9.

The following assumes that a series of processes for solving the aliasing problem are executed under the control of a processor included in the artifact removal section 514 in a case where the processor is configured to achieve a function of the artifact removal section 514.

The processor (that is referred to simply as "processor" below) included in the artifact removal section 514 performs a segmentation process of dividing an image into segments (portion/object) on the basis of the depth information calculated by the depth calculation section 511 in FIG. 6 (step S11). In this segmentation process, as an example, if cases of FIGS. 8A and 8B are seen as an example, a process is performed of dividing an image into a large background portion and a circular portion in the middle as segments.

Next, the processor performs a labeling process of attaching labels 1 to n (where n is an integer greater than or equal to 2) to the respective segments (step S12). In this labeling process, processes of scanning an image for each of the rows and assigning different labels to the respective segments (portion/object) are performed by a process of attaching the same label to a pixel having depth information continuous to the depth information of a nearby pixel.

Next, the processor creates a component object for each of the labels 1 to n (step S13). Here, the "component object" refers to the number of pixels and a depth average value (distance average value) of a segment.

Next, the processor increments a label counter i (step S14) and then determines a threshold for the number of pixels in a segment from the depth average value for the label 1 (i=1) (step S15). In the process of step S15, distance is taken into consideration for each of the respective segments to determine a threshold for the number of pixels in the segment. More specifically, a large threshold is set for short distance and a small threshold is set for long distance. The short distance indicates that the distance of a segment from the distance measurement device 1 is relatively short. The long distance indicates that the distance of a segment from the distance measurement device 1 is relatively long.

For short distance/long distance, it is possible to define predetermined distance (e.g., 1 m) as a reference (threshold). The threshold for the number of pixels in a segment is not, however, limited to the two patterns of short distance/long distance. The threshold may be further divided into three or more patterns. Details of the setting of the threshold for the number of pixels in a segment are described below.

Subsequently, the processor determines whether or not the number of pixels exceeds the threshold for the segment of the label 1 (step S16). In this determination process, in a case where the processor determines that the number of pixels exceeds the threshold (YES in S16), the processor validates the segment (step S17). In a case where the processor determines that the number of pixels is less than or equal to the threshold (NO in S16), the processor invalidates the segment (step S18).

After the process of step S17 or the process of step S18 is finished, the processor determines for all of the labels 1 to n whether or not the process of validating/invalidating the segments is finished (step S19). In a case where the process is finished (YES in S19), the processor finishes the series of processes for solving the aliasing problem described above. In addition, in a case where the process is not finished for all of the labels 1 to n (NO in S19), the processor returns to step S14 to increment the label counter i. The processor subsequently repeats and executes the processes of step S15 to step S19 for all of the labels 1 to n until the processor determines that the process of validating/invalidating the segments is finished.

As described above, in the distance measurement device 1 according to the present embodiment, the depth calculation section 511 calculates the depth information of a subject on the basis of RAW image data provided from the light detection unit 30, performs a segmentation process on the basis of the depth information, and performs a process of invalidating a segment in which the number of pixels is less than the threshold. This process makes it possible to solve the aliasing problem that is a problem peculiar to the indirect ToF distance measurement device. In other words, a result of the distance measurement of an object at the alias distance is not outputted from the distance measurement device 1 as a result of incorrect distance measurement. It is possible to output only a result of the distance measurement of an object whose correct distance (true distance) is measured.

[Setting of Threshold for Number of Pixels in Segment]

Here, the setting of the threshold for the number of pixels in a segment that serves as a reference to determine whether the segment is valid/invalid is described.

It is possible to define the size of a subject (object) subjected to distance measurement, calculate the number of pixels in a segment imaged on a distance basis from the focal distance or the pixel pitch of the light detection unit 30, and set this calculated number of pixels as a threshold.

A subject subjected to distance measurement is selected from objects in which the aliasing problem is likely to occur in particular, for example, high-reflectance objects each having a large specular reflection component such as metal and glass.

The aliasing problem does not occur in the whole of an object in which the aliasing problem is likely to occur, but the aliasing problem is likely to occur in the vicinity of the region opposed to laser light. Therefore, the size of the region in which the aliasing problem occurs is sometimes set for even a large object (subject).

MODIFICATION EXAMPLE

Although the technology according to the present disclosure has been described above on the basis of the preferred embodiments, the technology according to the present disclosure is not limited to the embodiments. The configuration and the structure of the distance measurement device described in each of the embodiments described above are examples and may be modified as appropriate. For example, in the embodiment described above, the threshold for the number of pixels in a segment is determined on the basis of the depth average value, but this is not limitative. It is also possible to adopt the following configurations.

For example, as illustrated in FIG. 10, an RGB camera 61 is used and a threshold for each subject is set in advance. An object recognition unit 62 then recognizes a subject on the basis of an imaging output of the RGB camera 61 and a parameter control unit 63 determines the threshold set in advance on the basis of a result of the recognition. A subject is not, however, recognized on the basis of an output of the RGB camera 61, but may be recognized on the basis of the final output of the distance measurement device 1, that is, distance image information including the respective pieces of information of the depth and the confidence value. Alternatively, a subject may be recognized on the basis of both an output of the RGB camera 61 and the final output of the distance measurement device 1.

<Practical Application Example>

It is possible to use the distance measurement device according to the present disclosure as a distance measurement device that is mounted on any type of a mobile body such as an automobile, an electric vehicle, a hybrid electric vehicle, a motorcycle, a bicycle, a personal mobility, an airplane, a drone, a vessel, a robot, a construction machine, and an agricultural machine (tractor). In addition, in the embodiment described above, the distance measurement device according to the present disclosure is described by using, as an example, a case where the distance measurement device is used as means for acquiring a distance image (depth map). It is, however, possible to apply the distance measurement device to autofocus that automatically adjust the focus (focus) of the camera in addition to simple use as means for acquiring a distance image.

<Electronic Apparatus According to the Present Disclosure>

The distance measurement device according to the present disclosure described above is usable as a distance measurement device mounted on each of a variety of electronic apparatuses. For example, it is possible to exemplify a mobile apparatus such as a smartphone, a digital camera, and a tablet as the electronic apparatus mounted with the distance measurement device. The mobile apparatus is not, however, limitative.

The following exemplifies a smartphone and a digital still camera as specific examples of the electronic apparatus in which the distance measurement device according to the present disclosure is used. Distance image information (depth information) of the distance measurement device mounted on any of a smartphone and a digital still camera is used as lens driving information for autofocus. The specific examples mentioned here are, however, merely examples. These specific examples are not limitative.

Specific Example 1: Example of Smartphone

FIG. 11A is an external view of a smartphone according to a specific example 1 of the electronic apparatus according to the present disclosure from the front side and FIG. 11B is an external view from the back side. The smartphone 100 according to this specific example includes a display unit 120 on the front side of a housing 110. In addition, the smartphone 100 includes, for example, an imaging unit 130 at the upper portion of the housing 110 on the back side.

The distance measurement device 1 according to the embodiment of the present disclosure described above is usable, for example, on the smartphone 100 that is an example of the mobile apparatus having the configuration described above. In this case, it is possible to dispose the light source 20 and the light detection unit 30 of the distance measurement device 1 near the imaging unit 130, for example, as illustrated in FIG. 11B. The disposition example of the light source 20 and the light detection unit 30 illustrated in FIG. 11B is, however, an example. This disposition example is not limitative.

As described above, the smartphone 100 according to the specific example 1 is manufactured by mounting the distance measurement device 1 according to the embodiment of the present disclosure. The smartphone 100 according to the specific example 1 is then able to obtain a result of accurate distance measurement by being mounted with the distance measurement device 1 described above while resolving the aliasing problem. This makes it possible to obtain a captured image in focus on the basis of the result of the distance measurement.

Specific Example 2: Example of Digital Still Camera

It is an external view of a lens interchangeable single lens reflex type digital still camera according to a specific example 2 of the electronic apparatus according to the present disclosure from the front side and FIG. 12B is an external view from the back side.

A lens interchangeable single lens reflex type digital still camera 200 includes, for example, an interchangeable taking lens unit (interchangeable lens) 212 on the right front side of a camera main body section (camera body) 211 and a grip section 213 for a photographer to grip on the left front side. Further, there is provided a monitor 214 substantially in the middle of the back of the camera main body section 211. There is provided a viewfinder (eyepiece window) 215 above the monitor 214. Looking into the viewfinder 215 allows the photographer to visually recognize a light image of a subject guided by the taking lens unit 212 and determine the compositions.

The distance measurement device 1 according to the embodiment of the present disclosure described above is usable, for example, on the digital still camera 200 that is an example of the mobile apparatus having the configuration described above. In this case, it is possible to dispose the light source 20 and the light detection unit 30 of the distance measurement device 1 near the taking lens unit 212, for example, as illustrated in FIG. 12A. The disposition example of the light source 20 and the light detection unit 30 illustrated in FIG. 12A is, however, an example. This disposition example is not limitative.

As described above, the digital still camera 200 according to the specific example 2 is manufactured by mounting the distance measurement device 1 according to the embodiment of the present disclosure. The digital still camera 200 according to the specific example 2 is then able to obtain a result of accurate distance measurement by being mounted with the distance measurement device 1 described above while resolving the aliasing problem. This makes it possible to obtain a captured image in focus on the basis of the result of the distance measurement.

<Configuration Adoptable by the Present Disclosure>

It is to be noted that the present disclosure may also have the following configurations.

<<A. Distance Measurement Device>>

[A-1] A distance measurement device including:
  a light detection unit that receives light from a subject;
  a depth calculation section that calculates depth information of the subject on the basis of an output of the light detection unit; and
  an artifact removal section that divides an image into segments on the basis of the depth information calculated by the depth calculation section and validates a segment of the respective segments in which a number of pixels exceeds a predetermined threshold and invalidates a segment in which the number of pixels is less than or equal to the predetermined threshold.

[A-2] The distance measurement device according to [A-1], in which the artifact removal section attaches labels to the respective segments and creates a component object for each of the labels.

[A-3] The distance measurement device according to [A-2], in which the artifact removal section assigns different labels to the respective segments by a process of attaching a same label to a pixel having depth information continuous to depth information of a nearby pixel.

[A-4] The distance measurement device according to [A-2] or [A-3], in which the component object includes the number of pixels and a depth average value of the segment.

[A-5] The distance measurement device according to any of [A-1] to [A-4], in which the artifact removal section changes the predetermined threshold in accordance with distance of the segment from the distance measurement device.

[A-6] The distance measurement device according to [A-5], in which the artifact removal section sets a large threshold for short distance and sets a small threshold for long distance, the short distance indicating that the distance of the segment from the distance measurement device is relatively short, the long distance indicating that the distance of the segment from the distance measurement device is relatively long.

<<B. Electronic Apparatus>>

[B-1] An electronic apparatus including:
a light detection unit that receives light from a subject;
a depth calculation section that calculates depth information of the subject on the basis of an output of the light detection unit; and
an artifact removal section that divides an image into segments on the basis of the depth information calculated by the depth calculation section and validates a segment of the respective segments in which a number of pixels exceeds a predetermined threshold and invalidates a segment in which the number of pixels is less than or equal to the predetermined threshold.

[B-2] The electronic apparatus according to [B-1], in which the artifact removal section attaches labels to the respective segments and creates a component object for each of the labels.

[B-3] The electronic apparatus according to [B-2], in which the artifact removal section assigns different labels to the respective segments by a process of attaching a same label to a pixel having depth information continuous to depth information of a nearby pixel.

[B-4] The electronic apparatus according to [B-2] or [B-3], in which the component object includes the number of pixels and a depth average value of the segment.

[B-5] The electronic apparatus according to any of [B-1] to [B-4], in which the artifact removal section changes the predetermined threshold in accordance with distance of the segment from the distance measurement device.

[B-6] The electronic apparatus according to [B-5], in which the artifact removal section sets a large threshold for short distance and sets a small threshold for long distance, the short distance indicating that the distance of the segment from the distance measurement device is relatively short, the long distance indicating that the distance of the segment from the distance measurement device is relatively long.

REFERENCE SIGNS LIST

1 . . . distance measurement device, 10 . . . subject (measurement target), 20 . . . light source, 30 . . . light detection unit, 40 . . . AE control unit, 41 . . . next-frame light emission/exposure condition calculator, 42 . . . next-frame light emission/exposure controller, 50 . . . distance measurement unit, 51 . . . distance image calculator, 61 . . . RGB camera, 62 . . . object recognition unit, 63 . . . parameter control unit

The invention claimed is:

1. A distance measurement device, comprising:
a light detection circuit configured to:
receive light from a subject; and
output data based on the received light; and
circuitry configured to:
calculate depth information of the subject based on the output data;
divide an image into a plurality of segments based on the depth information, wherein
the plurality of segments includes a first segment and a second segment, and
the first segment is different from the second segment;
set a first threshold for a number of pixels in the first segment based on at least one of a focal distance of the light detection circuit or a pixel pitch of the light detection circuit;
validate the first segment in a case where the number of pixels in the first segment exceeds the first threshold; and
invalidate the second segment in a case where a number of pixels in the second segment is one of less than or equal to a second threshold.

2. The distance measurement device according to claim 1, wherein the circuitry is further configured to:
attach a plurality of labels to the plurality of segments, wherein each label of the plurality of labels corresponds to a respective segment of the plurality of segments; and
create a component object for each label of the plurality of labels.

3. The distance measurement device according to claim 2, wherein
the circuitry is further configured to attach the same label to a first pixel of the image and a second pixel of the image, to assign different labels to the plurality of segments,
the first pixel has depth information continuous to depth information of the second pixel, and
the first pixel is in a vicinity of the second pixel.

4. The distance measurement device according to claim 2, wherein the component object associated with the first segment includes the number of pixels and a depth average value of the first segment.

5. A method of controlling a distance measurement device, the method comprising:
receiving image data of a subject from a light detection circuit;
calculating depth information of the subject based on the image data;

dividing an image into a plurality of segments based on the depth information, wherein
the plurality of segments includes a first segment and a second segment, and
the first segment is different from the second segment;
setting a first threshold for a number of pixels in the first segment based on at least one of a focal distance of the light detection circuit or a pixel pitch of the light detection circuit;
validating the first segment in a case where the number of pixels in the first segment exceeds the first threshold; and
invalidating the second segment in a case where a number of pixels in the second segment is one of less than or equal to a second threshold.

6. An electronic apparatus, comprising:
a distance measurement device including:
a light detection circuit configured to:
receive light from a subject; and
output data based on the received light; and
circuitry configured to:
calculate depth information of the subject based on the output data;
divide an image into a plurality of segments based on the depth information, wherein
the plurality of segments includes a first segment and a second segment, and
the first segment is different from the second segment;
set a first threshold for a number of pixels in the first segment based on at least one of a focal distance of the light detection circuit or a pixel pitch of the light detection circuit;
validate the first segment in a case where the number of pixels in the first segment exceeds the first threshold; and
invalidate the second segment in a case where a number of pixels in the second segment is one of less than or equal to a second threshold.

7. The distance measurement device according to claim 1, wherein the circuitry is further configured to set the second threshold for the second segment based on a second distance of the second segment from the distance measurement device, wherein
a first distance of the first segment from the distance measurement device is shorter than the second distance, and
the first threshold is larger than the second threshold.

* * * * *